United States Patent [19]

Kitazume et al.

[11] Patent Number: 4,672,668

[45] Date of Patent: Jun. 9, 1987

[54] METHOD AND APPARATUS FOR REGISTERING STANDARD PATTERN FOR SPEECH RECOGNITION

[75] Inventors: Yoshiaki Kitazume, Sayama; Toshikazu Yasue, Akishima; Eiji Ohira, Hachioji; Takeyuki Endo, Kodaira; Satoshi Asou, Yokohama, all of Japan

[73] Assignee: Hitachi, Ltd., Tokyo, Japan

[21] Appl. No.: 484,203

[22] Filed: Apr. 12, 1983

[30] Foreign Application Priority Data

Apr. 12, 1982 [JP] Japan .................................. 57-60664

[51] Int. Cl.[4] .............................................. G10L 5/00
[52] U.S. Cl. .................................... 381/43; 364/513.5
[58] Field of Search ................................... 381/41–43; 364/513.5

[56] References Cited

U.S. PATENT DOCUMENTS 3,470,321 9/1969 Dersch .................................. 381/43
4,454,586 6/1984 Pirz et al. .............................. 381/41

Primary Examiner—E. S. Matt Kemeny
Attorney, Agent, or Firm—Antonelli, Terry & Wands

[57] ABSTRACT

In order to produce and store a pattern of reference words for use in a speaker-dependent speech recognition system, the system prompts the operator of the system to speak standard words in a predetermined sequence. For this purpose, a prestored standard word is spoken by the system with a predetermined length, power and rhythm, and the operator then repeats the standard words while attempting to simulate the same predetermined length, power and rhythm. The standard word repeated by the operator is detected and processed to determine whether it meets a certain resemblance criteria with respect to the standard word as spoken by the system. If the standard word repeated by the operator does not meet the resemblance criteria, the system repeats the same standard word to prompt the operator to try again; and, if the standard word repeated by the operator meets the resemblance criteria, it is stored as a reference word. This operation is repeated for each of the sequence of prestored standard words.

3 Claims, 3 Drawing Figures

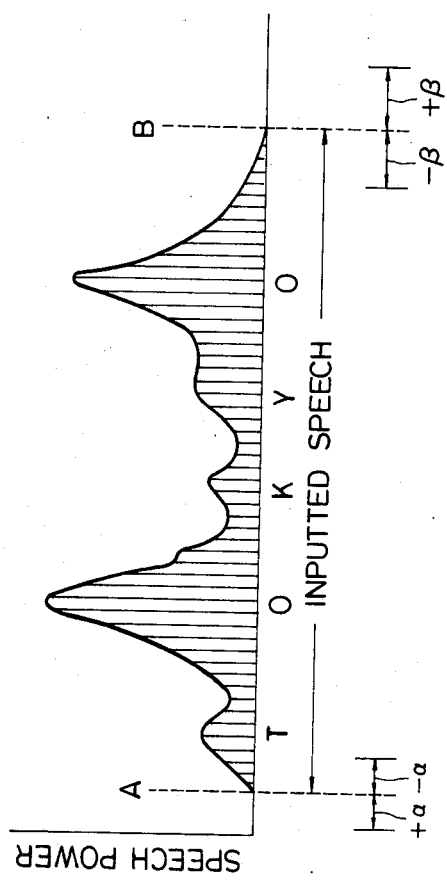

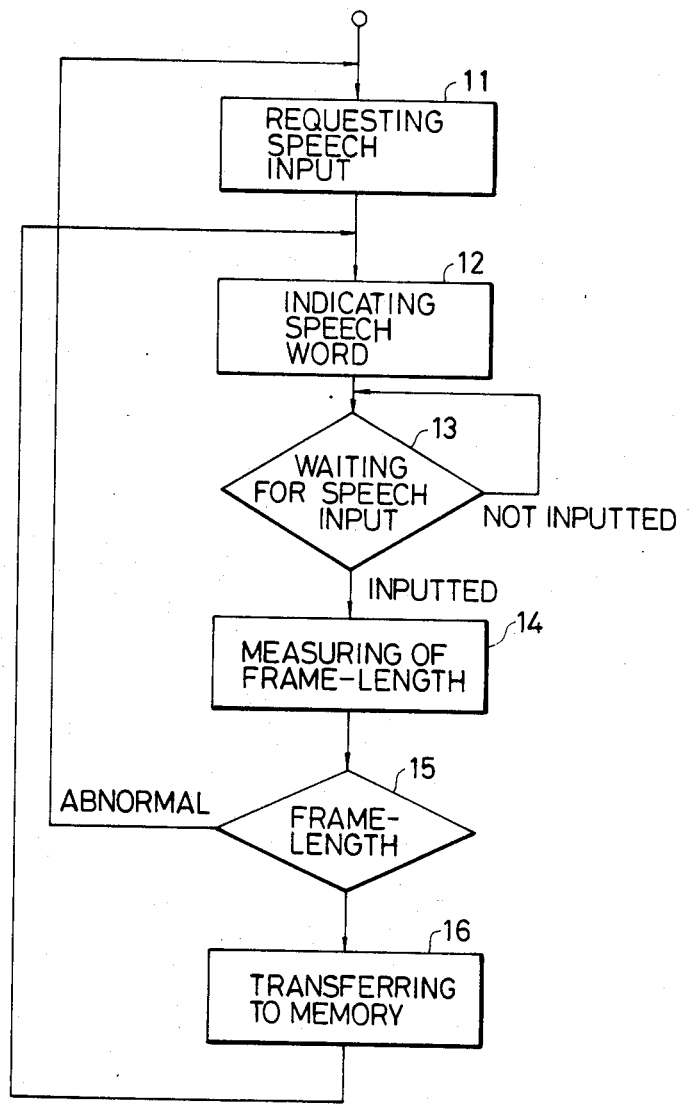

METHOD AND APPARATUS FOR REGISTERING STANDARD PATTERN FOR SPEECH RECOGNITION

BACKGROUND OF THE INVENTION

1. Field of the Invention

This invention relates to a method and apparatus for registering a standard pattern for speech pattern recognition. More particularly, the present invention relates to a method and apparatus for registering a standard pattern by inputting stably the length and amplitude, etc., of the speech by guiding the speaker with a speech output.

2. Description of the Prior Art

Various jobs such as the sorting of cargo, the input of inspection data, inquiries for banks balances, seat reservations and the like are now being carried out using spoken data or command inputs. The first two of these jobs have been realized in practice by speaker-dependent speech recognition, and the other two by speaker-independent speech recognition. In the speech recognition for these applications, the similarity of the input speech pattern with a standard speech pattern that is registered in advance in a memory is correlated to discriminate the input data. Hence the registration of the standard pattern is necessary. This registration is generally made for a speaker-dependent system and the quality of the standard pattern affects the speech recognition rate directly.

When registering a standard pattern in a conventional speaker-dependent speech recognition apparatus, the word to be registered next is displayed on a display panel provided in an operator box so that the user views the display and speaks so as to input the standard pattern. However, the length, power, and rhythm of the speech are likely to be unstable, and a satisfactory standard pattern can not always be registered.

SUMMARY OF THE INVENTION

To eliminate these problems with the prior art, the present invention is directed to provide a method and apparatus for registering a standard pattern for speech recognition which stabilizes the contents of the standard pattern to be registered in conjunction with the length, power, and rhythm of the speech, and thus improve the recognition rate.

To accomplish the object described above, the present invention is characterized in that a standard pattern is registered while the speaker is being guided by speech output from a speech output means in a speech recognition apparatus, which includes a speech input means, a feature extracting means, a similarity calculating means and a pattern matching means, by furnishing the apparatus with the speech output means described above. However, the speech produced by the speaker is not registered as a standard pattern unless it meets certain conditions for length, power and rhythm.

BRIEF DESCRIPTION OF THE DRAWINGS

FIG. 2 is a diagram illustrating the segmentation of the input speech and the measurement of the frame length in accordance with the present invention; and FIG. 3 is a flowchart of the registration of a standard pattern in accordance with the present invention.

DESCRIPTION OF THE PREFERRED EMBODIMENTS

Figure 1:
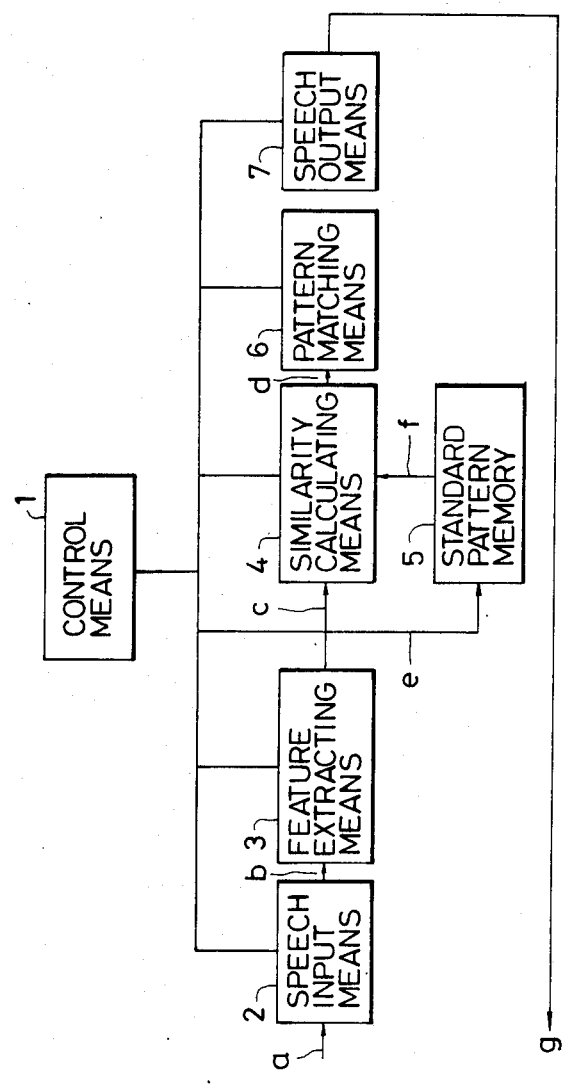
FIG. 1 is a block diagram of the speech recogniton apparatus in accordance with the present invention.

FIG. 1 is a block diagram of the speech recognition apparatus in accordance with an embodiment of the present invention.

In speaker-dependent speech recognition, the operator first speaks the standard pattern to be registered. The speech a thus spoken is then input to speech input means 2 where it is converted, first into an analog electrical signal and then into a digital electrical signal b, and is output to a feature extracting means. A filter bank, for example, is incorporated in the feature extracting means 3, extracts the frequency components in the input signal and outputs an extract output c. Generally, a band of up to approximately 4 KHz is divided into approximately 16 channels.

A time sequence signal output from the filter bank is transferred to a standard pattern memory 5 as a standard pattern e and is stored there by control means 1.

To carry out speech recognition using this standard pattern, each frequency component (constituting the input signal) c output from the feature extracting means is input to a similarity calculating means 4, where the frequency components f of the standard pattern are read sequentially from the standard pattern memory 5 so that a similarity calculation can be executed. Thus the similarity d in each time period t is input to a pattern matching means 6. The pattern matching means 6 executes overall correlation for the speech recognition. (Refer to Japanese Patent Laid-Open No. 83880/1982.)

To eliminate any unstability of the speech during the standard pattern registration, the present invention furnishes the control means 1 with check means for checking system-wise the input speech length, power, and rhythm, etc., of the speech. The present invention also includes speech output means for guiding the speaker by the speech output so as to obtain a more stabilized speech input and thus improve the speech recognition rate.

FIG. 2 is a diagram illustrating the frame length of a speech input and the input segmentation processing thereof, and FIG. 3 is a flowchart of the standard pattern registration in accordance with the present invention.

The controls means 1 shown in FIG. 1 control the standard pattern registration sequence.

In the registration mode, the control means 1 first actuates the speech output means 7 at step 11 of FIG. 3 to request a speech input. When reserving a seat, for example, the speech output "Registration please" is generated so as to guide the speech of the operator. The control means 1 then actuates the speech output means 7 at step 12 so as to specify the word. For example, the speech output "Tokyo" is generated so as to provide guidance for the length, power and rhythm of the word to be input so that the operator can speak the same word. In the next step 13, the control means 1 supervises the speech input means 2 to judge whether or not the word has been input. When the word "Tokyo" is input, the speech input means 2 sends it to the control means 1, which in turn executes, input segmentation processing as well as frame length measurement processing in step 14.

The speech power of the word "Tokyo", for example, can be measured by generating low energy for the consonants and high energy for the vowels and dividing the input speech length into frame units of 10 mS, as shown in FIG. 2. In this case, if the word is spoken too loudly, the speech power becomes large and the operation of the analog circuit would be driven into saturation. Hence the amplitude must be limited to below a predetermined level. Similarly, the standard pattern would become inappropriate if the speech length is too long or too short. Moreover, the rhythm would be disturbed if some section of the word "TOKYO" is spoken too rapidly with the other sections being spoken too slowly, again making the standard pattern inappropriate.

When the speech input to the speech input means 2 is converted to the digital signal b and is input to the feature extracting means 3, an output c is extracted for each frequency component by the extracting means 3 and is input to the control means 1 and to the similarity calculating means 4.

On the reception of an output such as the speech power from the feature extracting means 3, the control means 1 determine the start point and end point of the speech by the use of the output from the extracting means 3, and thus segments the input speech. (Refer to Japanese Patent Laid-Open No. 191699/1982 for details of the segmentation processing.)

The feature extracting means 3 is equipped with a register for storing input speech, in which the spoken words are stored.

After input segmentation, the control means uses the following equation to compare the frame length (F $L_{xi}$) that is obtained by the input segmentation processing, and the frame length (F $L_{stdi}$) of the designated word, to judge whether F $L_{xi}$ is normal or abnormal:

$$|(F L_{xi}) - (F L_{stdi})| \leq \delta \tag{1}$$

The input speech e stored in the register is read out therefrom and is transferred to the standard pattern memory 5 through the control means 1 only when this equation is satisfied.

The frame length (F $L_{xi}$) in equation (1) can be measured by counting the number of divisions of a frame that is divided into units of 10 mS. The designated frame length (F $L_{stdi}$) is stored together with a word table for the speech output in the working memory of the control means 1 by designating standard frame lengths for all the words and monosyllables to be registered. The difference $\delta$ between the frame lengths is a tolerance that is determined empirically and corresponds to $\pm \alpha$ and $\pm \beta$ shown in FIG. 2. In other words, the upper and lower limits of the frame are determined empirically in advance for each word or monosyllable and when the frame length is beyond this range, it is judged to be an inappropriate frame length.

If the frame length is judged to be normal at step 15, if equation (1) is satisfied, the contents of the register are transferred to the standard pattern memory 5 and the procedure is returned to step 12 so that the next word can be designated. If the frame length is judged to be abnormal at step 15, if equation (1) is not satisfied, the routine is returned to step 11 so that the request for the speech input is generated again, and the speech output of "Tokyo" as the indicated word of step 12 is again output from the speech output means 7. Incidentally, the speech output means consists of a speech synthesizing circuit that is well known in the art and can be accomplished by the use of a system, of editing pre-recorded words using a PCM system, or by the use of a speech synthesizing system using partial auto-correlation coefficients (PARCOR), for example. (Refer to Kazuo Nakada, "Speech", edited by Japan Speech Society, published by Corona Sha.)

In the repeat of an input request at step 11, the speech output "Please register the same word once again" is generated so as to guide the operator. In this manner, words such as "Yokohama", "Nagoya", "Kyoto", "Osaka" and the like can be registered in sequence.

The results of experiments carried out by the present inventors reveal that the recognition rate can be improved by 10 to 20% when the standard pattern is registered by using speech output guidance. Incidentally, although the registration unit is shown to be limited to a word in the flowchart of FIG. 3, it can be limited to a chain of vowel-consonant-vowel (VCV), and further to a monosyllable. In the flowchart of FIG. 3, only the frame length of the input speech is shown to be measured, so that only the speech length is stabilized, but limits can also be imposed upon the speech power, that is, the speech amplitude, and upon the speech rhythm, that is, the length of each section within the frame.

Another example of the application of the present invention is speech output guidance for registering speech patterns that are rendered synthetically soundless.

As described in the foregoing, the present invention designates the word to be input by a speech output from the speech output means so that the operator can speak the word in accordance with the contents of the speech output (length, power and rhythm of the speech), and the registration of a stable standard speech pattern becomes possible, thus improving the recognition rate. The present invention also checks the length, power, and rhythm of the speech so that if the speech input of the operator is widely different from the standard speech output, the input speech is rejected so that a new input speech can be input. Accordingly, a stable speech pattern can be obtained if the operator speaks so as to conform with the standard speech output. Furthermore, speech registration becomes easier because the operator simply speaks in accordance with the speech output without having to view the display.

What is claimed is:

1. A method of storing standard patterns for speech recognition, comprising the steps of:
   (a) speaking a selected standard word with a predetermined length, power and rhythm to produce a speech output so as to guide the operator to speak the standard word in accordance with the length, power and rhythm of said speech output to obtain a stabilized speech input;
   (b) detecting speech spoken by said operator in accordance with said speech output and converting said detected speech into a digital electrical signal;
   (c) extracting features of said speech from said digital signal;
   (d) checking whether or not the length of said speech represented by said digital electrical signal meets a resemblance criteria with respect to said speech output;
   (e) guiding the operator again to speak the same selected word in accordance with said speech output by again speaking said selected word with said predetermined length, power and rhythm when said speech represented by said digital electrical signal does not meet said resemblance criteria; and
   (f) storing the extracted features of said speech represented by said digital electrical signal in predetermined units as a standard speech pattern when said speech represented by said digital electrical signal meets said resemblance criteria.

2. A method according to claim 1, wherein said step of checking further includes checking whether or not the power of said speech represented by said digital electrical signal meets a said resemblance criteria.

3. A method according to claim 1, wherein said step of checking further includes checking whether or not the rhythm of said speech represented by said digital electrical signal meets said resemblance criteria.

* * * * *